(No Model.)
L. K. McCLYMONDS.
TIRE FOR VEHICLE WHEELS.
No. 485,110. Patented Oct. 25, 1892.
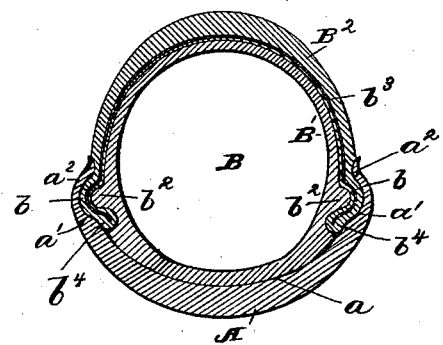
WITNESSES:
INVENTOR.
BY
ATTORNEYS.

UNITED STATES PATENT OFFICE.

LOUIS K. McCLYMONDS, OF CLEVELAND, OHIO, ASSIGNOR TO THE PEERLESS MANUFACTURING COMPANY, OF SAME PLACE.

TIRE FOR VEHICLE-WHEELS.

SPECIFICATION forming part of Letters Patent No. 485,110, dated October 25, 1892.

Application filed July 22, 1891. Serial No. 400,350. (No model.)

*To all whom it may concern:*

Be it known that I, LOUIS K. McCLYMONDS, a citizen of the United States, and a resident of the city of Cleveland, county of Cuyahoga, and State of Ohio, have invented certain new and useful Improvements in Tires for Vehicle-Wheels, of which the following is a specification, the principle of the invention being herein explained and the best mode in which I have contemplated applying that principle, so as to distinguish it from other inventions.

In said annexed drawing the figure represents a transverse section of my improved tire.

In the drawing the letter A indicates the rim of a vehicle-wheel, which rim may be of any suitable or desired form and material, being, however, formed with a wide trough or groove $a$, having small grooves $a'$ in its sides. The rim illustrated in the drawing is of metal and the grooves $a'$ are formed in the side flanges $a^2$ of the rim, the rim being of the general type employed for bicycle or other velocipede wheels.

In the drawing the tire is illustrated as of the type usually termed "pneumatic" tire; but although my improvement is especially adapted to such style of tire, yet it may be applied to the usual solid or cushion style of tire.

In the drawing the tire B is illustrated as composed of an inner tube $B'$, of rubber, having annular ribs $b^2$ formed upon its sides, and a strip or covering $B^2$, of rubber, having an inserted canvas layer $b^3$ and covering the tread and sides of the tire, the sides of said strip fitting between the flanges of the rim and the inner tube $B'$ and being bulged into the grooves in the flanges by the ribs $b^2$ upon the tube. The edges $b^4$ of the covering are preferably enlarged, so as to be held more firmly by the ribs $b^2$, said enlarged edges pressing into the inner tube.

When the tire is to be placed in the rim, it is collapsed if it is a pneumatic tire, or laterally compressed if it is a solid or a cushion tire. It is then placed in the trough of the rim and the covering-strip is placed over it with its edges beyond the ribs of the tire. The tire is thereupon inflated or expanded, when the edges of the covering-strip will be forced into and clamped within the grooves in the flanges of the rim by means of the ribs upon the tire. If the edges of the covering-strip are enlarged, said strip will be more securely clamped than if the edges are of the same thickness as the remainder of the strip. The outer covering will protect the inner tire and will in most cases preserve it against punctures, and when said covering is worn out it may be replaced at a comparatively-low cost, being less expensive than the tire, which is not exposed to wear and may outlast a number of coverings.

As the greater part of the tire and covering are free from the rim, the covering will not affect the yielding properties of the tire.

Other modes of applying the principle of my invention may be employed for the mode herein explained. Change may therefore be made as regards the mechanism herein set forth, provided the principles of construction respectively recited in the following claims are employed.

I therefore particularly point out and distinctly claim as my invention—

1. The combination, with the rim of a vehicle-wheel, said rim formed with a large peripheral groove having smaller grooves in its sides, of a yielding and elastic tire formed with annular ribs upon its sides corresponding to said side grooves and a covering-strip upon the tread of said tire, having its side edges clamped between the ribs of the tire and the side grooves of the rim, substantially as set forth.

2. The combination, with the rim of a vehicle-wheel, said rim being formed with a large peripheral groove having smaller grooves in its sides, of a yielding and elastic tire formed with annular ribs upon its sides corresponding to said side grooves and a covering-strip upon the tread of the tire, having its side edges clamped between the ribs and grooves and having enlarged edges fitting inside of the ribs and grooves, substantially as set forth.

In testimony that I claim the foregoing to be my invention I have hereunto set my hand this 16th day of July, A. D. 1891.

L. K. McCLYMONDS.

Witnesses:
J. B. FAY,
J. C. TURNER.